No. 697,691. Patented Apr. 15, 1902.
W. H. ST. JOHN.
CUSHION TIRE.
(Application filed Oct. 7, 1901.)
(No Model.)
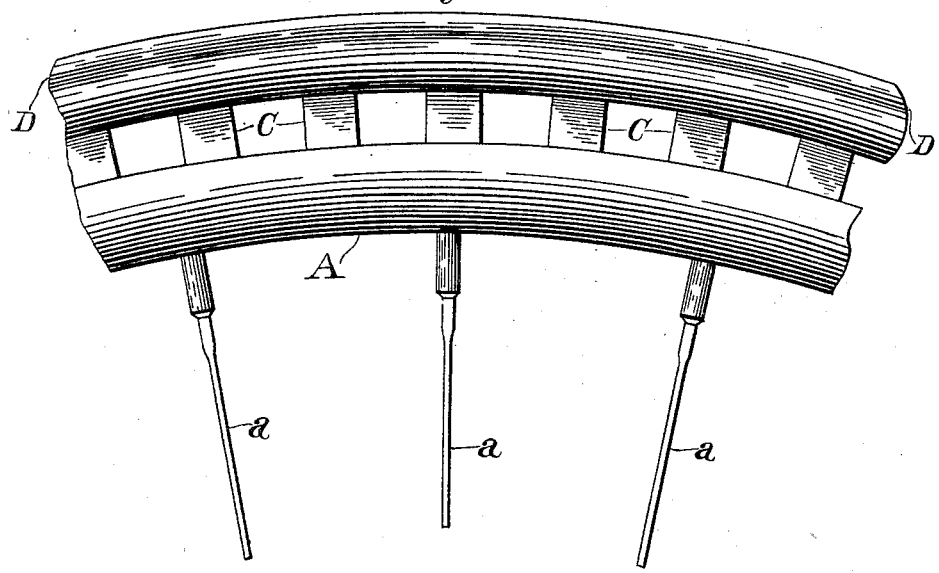
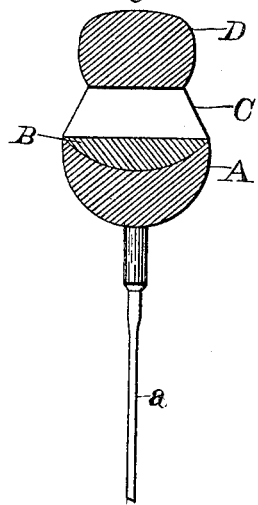

UNITED STATES PATENT OFFICE.

WILLIAM H. ST. JOHN, OF BROOKLYN, NEW YORK.

CUSHION-TIRE.

SPECIFICATION forming part of Letters Patent No. 697,691, dated April 15, 1902.

Application filed October 7, 1901. Serial No. 77,851. (No model.)

*To all whom it may concern:*

Be it known that I, WILLIAM H. ST. JOHN, a citizen of the United States, residing at Brooklyn, in the county of Kings and State of New York, have invented certain new and useful Improvements in Cushion-Tires; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to cushion-tires for vehicle-wheels; and its object is to provide a solid tire free from the objectionable features of an inflated tire, while retaining all the desirable qualities—such as full elasticity, lightness, and cheapness—and possessing greater durability.

My present invention is an improved and perfected form of the tire shown and described in Letters Patent of the United States issued to myself and Omer W. Wait February 26, 1901, and numbered 669,049, and embodies the result of an extended series of experiments carried out by myself to determine the most advantageous construction for a tire of the character referred to.

Each constituent element of my invention is described in detail, and its individual office, together with the mode of operation of the whole, is fully explained in this specification.

Of the accompanying drawings, throughout which like letters designate like parts, Figure 1 represents a side view, and Fig. 2 a cross-section, of my invention applied to the rim of a bicycle-wheel.

Considering the drawings, letter A marks the rim of the wheel, and *a a* the spokes. It is an ordinary grooved rim, such as are commonly employed in connection with inflated tires.

Letter B marks the base of the tire, and it is formed to fit the groove in the rim, as shown in Fig. 2. It will be observed that the base B is of the same width as the rim A.

Letters C C mark the cushions, and attention is called to their peculiar and special construction. Each cushion C must be as wide as the base and rim where it connects with the base, and its sides converge inwardly and upwardly until the tread D is joined.

My experience in constructing and using tires of this description is that a relatively narrow tread D is advantageous and light and if given the proper elasticity where it bears upon the roadway will insure sufficient grip for making turns in direction however abrupt. The diameter of the tread determined by me as best suited for all purposes and riders is about seven-eighths of an inch and of partly-cylindrical shape, as illustrated. From the tread the sides of the cushions slope downwardly and outwardly until their bottoms are as wide as the base. Constructed as described each cushion C can bend forward and backward as the wheel is running and as the successive portions of the tread between the cushions are brought to bear upon the roadway, and the machine is thus continuously cushioned vertically to any desired extent, depending upon the rubber composing the parts and their size; but while the cushions may readily bend forward or back, as stated, they cannot, owing to their widening breadth at bottom, bend sidewise, and the tread of the wheel is prevented from lateral displacement when making sharp turns. The reason for the formation of the cushions as shown and described will now be understood.

It is my practice to fashion all the parts—base, cushions, and tread—in one piece, and the tire may be cemented to the common wooden rim by any of the usual preparations.

Having thus described my invention, what I claim, and desire to secure by Letters Patent of the United States, is—

As a new article of manufacture, a cushion-tire comprising a base adapted to fit the rim of a wheel, a relatively narrow tread, and cushions joining the said base and tread at intervals, the said cushions being narrow at the top and broadening laterally downward to the width of the base, the said tread, cushions and base being constructed in one piece, substantially as described.

In testimony whereof I affix my signature in presence of two witnesses.

WILLIAM H. ST. JOHN.

Witnesses:
J. E. HOUGHTON,
E. W. MORROW.